United States Patent
Chen et al.

(10) Patent No.: US 9,130,229 B2
(45) Date of Patent: Sep. 8, 2015

(54) CARBON FLUORIDE CATHODES AND BATTERIES MADE THEREFROM

(71) Applicant: MEDTRONIC, INC., Minneapolis, MN (US)

(72) Inventors: Kaimin Chen, Shoreview, MN (US); Parthasarathy M. Gomadam, Maple Grove, MN (US); Gaurav Jain, Edina, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 13/754,970

(22) Filed: Jan. 31, 2013

(65) Prior Publication Data

US 2014/0186713 A1 Jul. 3, 2014

Related U.S. Application Data

(60) Provisional application No. 61/748,190, filed on Jan. 2, 2013.

(51) Int. Cl.
| | |
|---|---|
| *H01M 4/00* | (2006.01) |
| *H01M 4/583* | (2010.01) |
| *H01M 4/133* | (2010.01) |
| *H01M 4/36* | (2006.01) |
| *H01M 4/58* | (2010.01) |
| *H01M 10/05* | (2010.01) |
| *H01M 10/052* | (2010.01) |

(Continued)

(52) U.S. Cl.
CPC ............ *H01M 4/5835* (2013.01); *H01M 4/133* (2013.01); *H01M 4/364* (2013.01); *H01M 4/581* (2013.01); *H01M 10/05* (2013.01); *H01M 10/052* (2013.01); *H01M 2/162* (2013.01); *H01M 2/1653* (2013.01); *H01M 4/38* (2013.01); *H01M 4/381* (2013.01); *H01M 4/382* (2013.01); *H01M 4/40* (2013.01); *H01M 4/405* (2013.01); *H01M 4/46* (2013.01); *H01M 4/621* (2013.01); *H01M 4/622* (2013.01); *H01M 4/623* (2013.01); *H01M 4/624* (2013.01); *H01M 4/625* (2013.01); *H01M 10/0525* (2013.01); *H01M 10/0564* (2013.01); *H01M 2010/4292* (2013.01); *Y02E 60/122* (2013.01)

(58) Field of Classification Search
CPC .............................. H01M 2/162; H01M 4/133
USPC ............... 429/231.95, 218.1, 231.7, 245, 217
See application file for complete search history.

(56) References Cited

U.S. PATENT DOCUMENTS

| 4,686,161 A | 8/1987 | Shia et al. |
| 5,180,642 A | 1/1993 | Weiss et al. |

(Continued)

FOREIGN PATENT DOCUMENTS

EP    1816692  A1    8/2007

OTHER PUBLICATIONS

Zhang et al., Enhancement of Discharge Performance of Li/CFx Cell by Thermal Treatment of CFx Cathode Material, Journal of Power Sources, 2009, pp. 601-605.

(Continued)

*Primary Examiner* — Cynthia H Kelly
*Assistant Examiner* — Monique Wills

(57) ABSTRACT

Electrochemical cells containing a stoichiometric capacity ratio of carbon-treated carbon monofluoride to carbon monofluoride being greater than 1:1 provide electrochemical cells having a tunable end-of-service indication.

13 Claims, 1 Drawing Sheet

(51) Int. Cl.
  *H01M 2/16*       (2006.01)
  *H01M 4/38*       (2006.01)
  *H01M 4/40*       (2006.01)
  *H01M 4/46*       (2006.01)
  *H01M 4/62*       (2006.01)
  *H01M 10/0525*    (2010.01)
  *H01M 10/0564*    (2010.01)
  *H01M 10/42*      (2006.01)

(56) References Cited

U.S. PATENT DOCUMENTS

| | | | |
|---|---|---|---|
| 7,563,542 | B2 | 7/2009 | Yazami et al. |
| 7,824,805 | B2 | 11/2010 | Howard et al. |
| 2004/0072075 | A1 | 4/2004 | Tsukamoto et al. |
| 2006/0162150 | A1* | 7/2006 | Tsukamoto et al. ......... 29/623.5 |
| 2008/0038643 | A1* | 2/2008 | Krehl et al. ................... 429/322 |
| 2009/0090640 | A1 | 4/2009 | Jang et al. |
| 2012/0088164 | A1 | 4/2012 | Foster et al. |
| 2012/0126182 | A1 | 5/2012 | Zhang et al. |

OTHER PUBLICATIONS

Zhang et al., Carbothermal Treatment for the Improved Discharge Performance of Primary Li/CFx Battery, Journal of Power Sources, 2009, pp. 648-652.

(PCT/US2013/076404) PCT Notification of Transmittal of the International Search Report and the Written Opinion of the International Searching Authority, Mailed Apr. 4, 2014, 10 pages.

* cited by examiner

CARBON FLUORIDE CATHODES AND BATTERIES MADE THEREFROM

FIELD

The invention relates to cathode compositions and batteries that provide an end-of-service (EOS) indication.

BACKGROUND

Lithium-carbon-monofluoride (Li/CFx) battery chemistry has been proven to have excellent stability in commercial applications. However, Li/CFx battery chemistry has had little commercial success in medical device applications due to its limited power capability and its lack of an adequate end-of-service indication in its discharge curve.

Recently, hybrid cathodes have been developed to provide the required power capability and an EOS indication for medical device usage. However, some of these hybrid cathode chemistries are unsuitable for autoclaving, provide a resistance increase at voltage transitions from one compound to another which limits full utilization of the available power capacity, and release gases at the end of discharge, which causes pressure within the cell.

SUMMARY

In one embodiment, the disclosure provides composite cathodes that comprise a mixture of carbon monofluoride and carbon-coated carbon monofluoride, where the stoichiometric capacity ratio of carbon-treated carbon monofluoride to carbon monofluoride being greater than 1:1.

In another embodiment, the disclosure provides an electrochemical cell comprising a composite cathode that comprise a mixture of carbon monofluoride and carbon-coated carbon monofluoride, where the stoichiometric capacity ratio of carbon-treated carbon monofluoride to carbon monofluoride being greater than 1:1, an anode, and an electrolyte.

DETAILED DESCRIPTION

Figure 1:
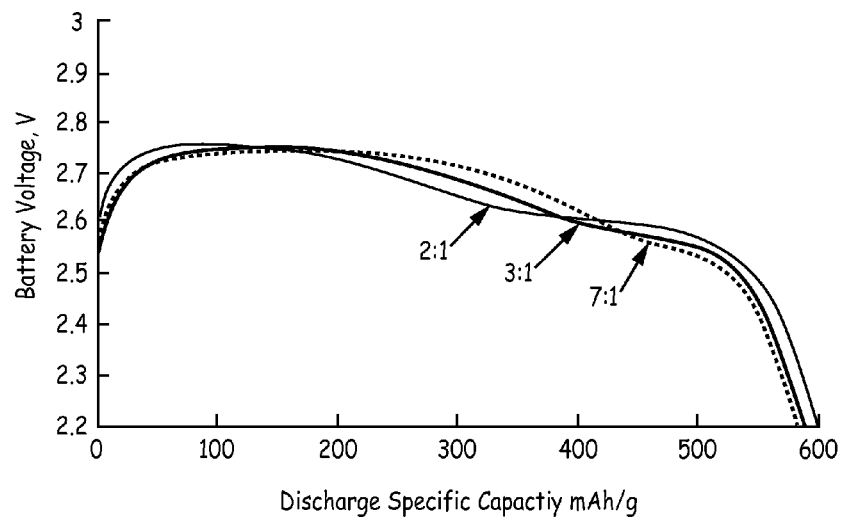
FIG. 1 depicts the end of service indicator performance of electrochemical cells having cathodes made using varying ratios of carbon-coated carbon monofluoride and carbon monofluoride.

"Carbon monofluoride (CFx)" as used in this application refers to carbon monofluoride battery materials made through the fluorination of carbon materials. The carbon monofluoride is commercially available with trade names such as CARBOFLUOR, and FLUORSTAR or simply known as battery grade carbon fluoride "Carbon-coated carbon monofluoride (C—CFx)" as used in this application refers to materials resulting from the carbon coating of commercially available carbon monofluoride through various treatment methods with carbon, or organic compound or polymer precursors such as those reported using methods of thermal treatment, carbothermal treatment, mechano-chemical methods, or a high energy milling method. Literature references include Zhang et al., "Carbothermal treatment for the improved discharge performance of primary Li/CFx battery", *Journal of Power Sources,* 191, (2009): 648-651 and Zhang et al., "Enhancement of discharge performance of Li/CFx cell by thermal treatment of CFx cathode material", *Journal of Power Sources,* 188, (2008): 601-605.

"Stoichiometric capacity ratio" means ratio of the expected capacity of one active cathode component over the expected capacity of another active cathode component in a mixed cathode such as a mixture of carbon-coated carbon fluoride and carbon fluoride. In current embodiments, the stoichiometric capacity ratio of a carbon-coated carbon fluoride and carbon fluoride mixture is the same as the ratio of the weight percentage of the two components in the mixture.

The composite cathodes and electrochemical cells of the disclosure can be used in power sources for use in medical devices. One of the advantages of the composite cathodes and electrochemical cells of the disclosure is that such chemistries provide an end-of-service (EOS) indication in the form of electrochemical discharge voltage. Additionally, by varying the stoichiometric capacity ratios of carbon-treated carbon monofluoride to carbon monofluoride, the EOS indication can be provided to meet particular application needs.

The composite cathodes described in this application comprise a mixture of carbon monofluoride (CFx) and carbon-coated carbon monofluoride (C—CFx) in a stoichiometric capacity ratio of carbon-treated carbon monofluoride to carbon monofluoride being greater than 1:1. In other embodiments the stoichiometric capacity ratio of carbon-treated carbon monofluoride to carbon monofluoride is in a range from greater than 1:1 to 9:1; from greater than 1:1 to 7:1; from greater than 1:1 to 5:1; from greater than 1:1 to 3:1; from greater than 1:1 to 2:1, and any range of ratios between any of these ranges in increments of 0.1 or more; from 1.1:1 to 9:1 including any range in between by increments or 0.1 or greater.

The combined amounts of C—CFx and CFx may be present in the composite cathode mixture in an amount by weight of from 70% to 95%. In other embodiments, the combined amounts of C—CFx and CFx may be present in the composite cathode mixture in an amount by weight of 71, 72, 73, 74, 75, 76, 77, 78, 79, 80, 81, 82, 83, 84, 85, 86, 87, 88, 89, 90, 91, 92, 93, or 94 percent and can be present in any range inclusive of these amounts.

The composite cathodes may also contain one or more binders. Examples of useful binders include polytetrafluoroethylene (PTFE), polyvinylidene fluoride (PVDF), styrene butadiene rubbers (SBR), carboxymethyl celluloses (CMC), ethylene-propylene-diene (EDPM) rubbers and polyvinyl alcohols (PVA). The binders may be present in the composite cathode mixtures in amounts of up to 20% by weight.

In other embodiments, the binders may be present in the composite cathode mixtures in amounts of up to 1, 2, 3, 4, 5, 6, 7, 8, 9, 10, 11, 12, 13, 14, 15, 16, 17, 18, and 19 percent and can be present in any range inclusive of these amounts. In another embodiment, the binder may not be present in the composite cathode mixtures.

The composite cathodes may also contain one or more conductive additives such as carbon black (for example, those sold under the tradenames SUPER-P and SUPER-S, from TIMCAL Graphite and Carbon), graphite, and carbon nanotubes. Such additives may be present in the composite cathode mixtures in an amount of up to 15% by weight.

In other embodiments, the conductive additives may be present in the composite cathode mixtures in amounts of up to 1, 2, 3, 4, 5, 6, 7, 8, 9, 10, 11, 12, 13, and 14, percent and can be present in any range inclusive of these amounts. In another embodiment, the conductive additives may not be present in the composite cathode mixtures.

Useful anode materials include metals. Examples of useful metals for the anodes of the electrochemical cells described in this application include, lithium, potassium, sodium, calcium, magnesium, and aluminum and alloys of any of them. In another embodiment, useful anode materials include one selected from the group consisting of lithium, potassium, sodium, calcium, magnesium, and aluminum, and alloys of any of them.

Useful electrolytes include those from the classes of organic electrolytes, polymer electrolytes, ionic liquid electrolytes and phase-changing electrolytes and those selected from the group consisting of organic electrolytes, polymer electrolytes, ionic liquid electrolytes and phase-changing electrolytes.

Useful separators include those made from microporous polyethylene or polypropylene, non-woven microporous polyethylene or polypropylene, and combinations of any of the forgoing, for example, separators having multiple layers.

Generally, the cathode mixtures are made by mixing the CFx and C—CFx and conductive carbon in a solvent mixture of water and isopropanol. An aqueous mixture of PTFE is then added to the above composition and mixed. The composition is then dried at about 150° C.

EXAMPLES

General cathode compositions were made having the following compositions:

Cathode Composition 1: C—CFx/CFx—80% by weight; conductive carbon—5% by weight; and binder (PTFE)—15% by weight.

Cathode Composition 2: C—CFx/CFx—88% by weight; conductive carbon—5% by weight; and binder (PTFE)—7% by weight.

Using Cathode Composition 1, compositions having the following C—CFx to CFx stoichiometric capacity ratios were prepared: 7 to 1; 3 to 1 and 2 to 1.

Each of the prepared cathode compositions were used in test cells containing lithium anodes.

Figure 2:
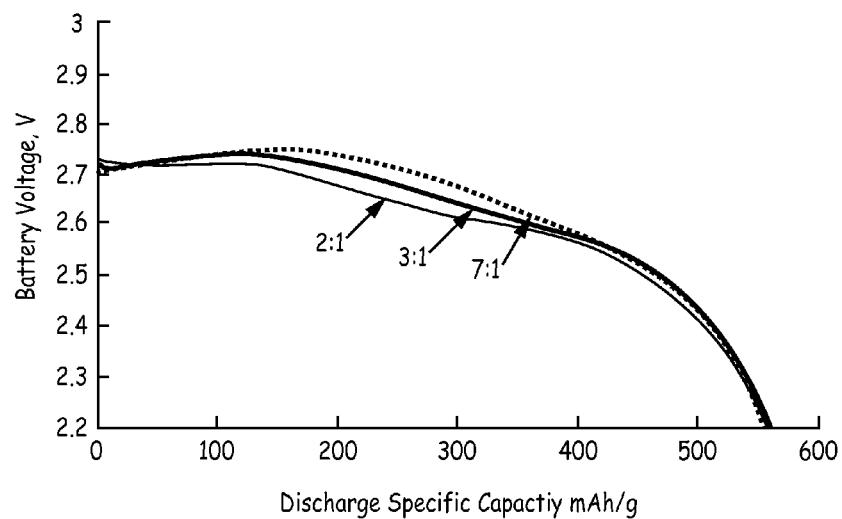
FIG. 2 depicts the end of service indicator performance of electrochemical cells having cathodes made using varying ratios of carbon-coated carbon monofluoride and carbon monofluoride.

In one set of cells, 1.0 M LiAsF6 in propylene carbonate and dimethoxyethane (1.0 M LiAsF6/PC/DME) was used as the electrolyte (FIG. 1) and in another set of cells, 1.0 M LiBF4 LiBF4 in gamma-butyrolactone (1.0 M LiBF4/GBL) was used as the electrolyte (FIG. 2).

FIG. 1 shows discharge curves for cells utilizing 1.0 M LiAsF6/PC/DME as the electrolyte and Cathode Composition 1 having the following C—CFx to CFx stoichiometric capacity ratios: 7 to 1; 3 to 1 and 2 to 1. All three curves show a $2^{nd}$-step capacity that is useful for an EOS indicator.

FIG. 2 shows discharge curves for cells utilizing 1.0 M LiBF4/GBL as the electrolyte and Cathode Composition 1 having the following C—CFx to CFx stoichiometric capacity ratios: 7 to 1; 3 to 1 and 2 to 1. All three curves show a $2^{nd}$-step capacity that is useful for an EOS indicator.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that exemplary embodiments may be embodied in many different forms and that neither should be construed to limit the scope of the disclosure. In some exemplary embodiments, well-known processes, well-known device structures, and well-known technologies are not described in detail.

What is claimed:

1. An electrochemical cell comprising:
a metal anode;
an electrolyte; and
a composite cathode, the composite cathode comprising a mixture of carbon monofluoride (CFx) and carbon-coated carbon monofluoride (C—CFx), the stoichiometric capacity ratio of carbon-treated carbon monofluoride to carbon monofluoride being in a range of from greater than 1:1 to 9:1.

2. The electrochemical cell of claim 1 wherein the stoichiometric ratio of carbon-treated carbon monofluoride to carbon monofluoride is in a range from greater than 1:1 to 2:1.

3. The electrochemical cell of claim 1 wherein the anode is lithium metal.

4. The electrochemical cell of claim 1 wherein the electrolyte is nonaqueous.

5. The electrochemical cell of claim 1 further comprising a separator between the anode and the cathode.

6. The electrochemical cell of claim 1 further comprising a binder in the cathode mixture.

7. The electrochemical cell of claim 1 further comprising a conductive additive in the cathode mixture.

8. The electrochemical cell of claim 1 wherein the combined amounts of C—CFx and CFx are present in the composite cathode in an amount by weight of from 70% to 95%.

9. The electrochemical cell of claim 6 wherein a binder is present in the composite cathode in an amount of up to 20% by weight.

10. The electrochemical cell of claim 7 wherein a conductive additive is present in the composite cathode in an amount of up to 15% by weight.

11. The electrochemical cell of claim 1 wherein the stoichiometric ratio of carbon-treated carbon monofluoride to carbon monofluoride is in a range from greater than 1:1 to 3:1.

12. The electrochemical cell of claim 1 wherein the stoichiometric ratio of carbon-treated carbon monofluoride to carbon monofluoride is in a range from greater than 1:1 to 5:1.

13. The electrochemical cell of claim 1 wherein the stoichiometric ratio of carbon-treated carbon monofluoride to carbon monofluoride is in a range from greater than 1:1 to 7:1.

* * * * *